(12) United States Patent
Noe et al.

(10) Patent No.: US 10,604,898 B2
(45) Date of Patent: Mar. 31, 2020

(54) RAIL-BOUND MAGLEV TRAIN

(71) Applicant: Karlsruher Institut fuer Technologie, Karlsruhe (DE)

(72) Inventors: Mathias Noe, Schauenburg (DE); Bernhard Holzapfel, Eckental (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 233 days.

(21) Appl. No.: 15/549,188

(22) PCT Filed: Feb. 9, 2016

(86) PCT No.: PCT/EP2016/000215
§ 371 (c)(1),
(2) Date: Aug. 7, 2017

(87) PCT Pub. No.: WO2016/128130
PCT Pub. Date: Aug. 18, 2016

(65) Prior Publication Data
US 2018/0030662 A1 Feb. 1, 2018

(30) Foreign Application Priority Data
Feb. 11, 2015 (DE) .................. 10 2015 001 746

(51) Int. Cl.
*E01B 25/32* (2006.01)
*B60L 13/04* (2006.01)
(Continued)

(52) U.S. Cl.
CPC .............. *E01B 25/32* (2013.01); *B60L 13/04* (2013.01); *B61B 13/08* (2013.01); *E01B 25/30* (2013.01)

(58) Field of Classification Search
CPC ......... B60L 13/04; B61B 13/08; E01B 25/30; E01B 25/32
(Continued)

(56) References Cited

U.S. PATENT DOCUMENTS 3,589,300 A 6/1971 Wipf
3,845,720 A * 11/1974 Bohn .................... B60L 13/003
104/130.02
(Continued)

FOREIGN PATENT DOCUMENTS

CN 201030803 Y 3/2008
DE 643316 C 4/1937
(Continued)

*Primary Examiner* — Zachary L Kuhfuss
(74) *Attorney, Agent, or Firm* — Leydig, Voit & Mayer, Ltd.

(57) ABSTRACT

A rail-bound maglev train comprising a guide rail which predefines a travel path, having at least one supra-conductive element (2) and a levitating vehicle which is arranged on the guide rail and has magnetic means (6), wherein the magnetic means interact magnetically in a contactless fashion with the travel path, and at least one supra-conductive element (2) comprises at least one supra-conductive conductor parallel to the travel path (4), and the at least one supra-conductive conductor has at least two electrical connections, wherein the respective at least two connections bound, on a strip, a strip section, arranged between said connections, as a continuous supra-conductive electrical line.

20 Claims, 1 Drawing Sheet

(51) Int. Cl.
*E01B 25/30* (2006.01)
*B61B 13/08* (2006.01)

(58) Field of Classification Search
USPC .................. 104/281, 286; 335/216
See application file for complete search history.

(56) References Cited

U.S. PATENT DOCUMENTS

| | | | | |
|---|---|---|---|---|
| 4,072,110 | A * | 2/1978 | Jayawant | B61B 13/08 104/130.02 |
| 4,641,586 | A | 2/1987 | Miller et al. | |
| 4,888,629 | A * | 12/1989 | Harada | H01L 39/228 257/35 |
| 5,222,437 | A | 6/1993 | Shibata et al. | |
| 5,249,529 | A | 10/1993 | Herbermann | |
| 5,291,834 | A * | 3/1994 | Quaas | E01B 25/32 104/124 |
| 5,479,145 | A * | 12/1995 | Kalsi | B60L 13/10 104/285 |
| 5,666,883 | A * | 9/1997 | Kuznetsov | B60L 13/04 104/281 |
| 5,668,090 | A * | 9/1997 | Kalsi | B60L 13/10 104/286 |
| 6,101,952 | A * | 8/2000 | Thornton | B60L 13/003 104/130.02 |
| 6,357,358 | B2 * | 3/2002 | Henderson | B60L 13/04 104/130.02 |
| 6,357,359 | B1 * | 3/2002 | Davey | B60L 13/10 104/281 |
| 6,418,857 | B1 * | 7/2002 | Okano | B60L 13/04 104/281 |
| 6,584,671 | B2 * | 7/2003 | Miller | B60L 13/03 156/305 |
| 6,684,794 | B2 * | 2/2004 | Fiske | B60L 13/04 104/281 |
| 6,758,146 | B2 * | 7/2004 | Post | B60L 13/04 104/281 |
| 7,348,691 | B2 * | 3/2008 | Davis | B60L 13/04 310/12.19 |
| 7,365,271 | B2 * | 4/2008 | Knoll | H01L 39/143 174/125.1 |
| 8,700,110 | B2 * | 4/2014 | Ha | H01L 39/143 174/125.1 |
| 8,880,135 | B2 * | 11/2014 | Suzuki | H01L 39/143 174/125.1 |
| 9,721,707 | B2 * | 8/2017 | Oomen | H01F 6/06 |
| 2004/0107863 | A1 | 6/2004 | Falter et al. | |
| 2018/0030662 | A1 * | 2/2018 | Noe | B60L 13/04 |

FOREIGN PATENT DOCUMENTS

| | | |
|---|---|---|
| DE | 1952757 | 4/1970 |
| DE | 3004704 C2 | 4/1984 |
| DE | 3927453 C2 | 2/1991 |
| DE | 4204732 A1 | 9/1992 |
| DE | 10218439 A1 | 12/2002 |
| DE | 10357264 A1 | 7/2005 |
| GB | 191109573 A | 3/1912 |
| JP | S 63287305 A | 11/1988 |
| JP | H 0226204 A | 1/1990 |
| JP | H 11107201 A | 4/1999 |

* cited by examiner

RAIL-BOUND MAGLEV TRAIN

CROSS REFERENCE TO RELATED APPLICATIONS

This application is a U.S. National Stage Application under 35 U.S.C. § 371 of International Application No. PCT/EP2016/000215 filed on Feb. 9, 2016, and claims benefit to German Patent Application No. DE 10 2015 001 746.2 filed on Feb. 11, 2015. The International Application was published in German on Aug. 18, 2016 as WO 2016/128130 A1 under PCT Article 21(2).

FIELD

The invention relates to a rail-bound maglev train.

BACKGROUND

Maglev train systems are counted among those transport systems that are distinguished by a vehicle being operated without physical contact on a support system guiding the vehicle in at least one direction. For the guided, contact-free operation, the support system and the vehicle have to physically interact. For this purpose, known systems for example use an air cushion or magnetic forces which are in equilibrium with the weight force or other forces that are acting due to the vehicle or other sources of force. In maglev train systems, rails which predetermine the ability of the vehicle to move in two of three spatial directions are preferably used as support systems. This means that it is only still possible for the vehicle to move in the horizontal orientation of the rail that remains unguided.

In the levitating state, maglev systems move along e.g. on a running surface without any solid friction or hydraulic friction, and therefore allow for low-friction operation that is particularly suitable for high transport speeds. The drive for propelling the vehicle is preferably provided by means of electromagnetic linear motors that also do not have any physical contact, either in the vehicle or in the support system, or also by means of vehicle-side turbomachines.

Magnetically acting levitating train concepts have been known for quite some time. A distinction is made between electrodynamic, electromagnetic and permanent-magnet levitating train systems.

As early as 1911, a first electrodynamic levitating transport system was described in GB 1911 9573, in which a vehicle is kept levitating on an aluminum line by means of periodic or interrupted magnetic fields having repelling forces. Both horizontally and vertically acting magnetic fields are described, said vehicle being propelled by a propeller. In the electrically conductive but non-magnetic line, eddy currents develop in the process. Alternating magnetic fields, caused by the vehicle speed, are absolutely necessary for setting the above-mentioned repelling forces and thus a levitating state.

An electromagnetic maglev train concept was described in 1937 in DE 643 316. In this concept, a vehicle is guided on iron rails, i.e. ferromagnetic rails, in a levitating manner by means of fields generated using electromagnets. The electromagnets are distributed between the rails and on the vehicles. Here, it is essential to regulate the magnetic fields by means of distance control systems, the distance between the rail and the vehicle being determined inductively or capacitively.

DE 39 27 453 C2 describes, by way of example, a permanent-magnetic concept in which passive permanent magnets and soft-iron pole elements are used.

Maglev train systems are thus particularly suitable for producing high-speed trains, in particular for passenger transport. Corresponding systems are already in the test phase and are based on the concepts set out below.

DE 30 04 704 C2 discloses an electromagnetic levitation principle, as has been used in the Transrapid system, for example. The rails are formed by a line that has a laminated iron core and interacts magnetically with vehicle-side horizontally and vertically acting magnetic sources, preferably electromagnets. Forces of attraction act between the line and the magnetic sources, and counteract the weight force and the laterally acting guiding forces of the vehicle in equilibrium. In order to raise the vehicle using forces of attraction, some of the magnetic sources are arranged under the line, i.e. the supports for said magnetic sources engage around the edges of the line. Gap regulation for maintaining the gap width between the vehicle and the rail actively intervenes in the control of the magnetic sources.

Current concepts for a maglev train system use superconducting magnets that magnetically interact with electrically conductive coils and generate a magnetic force that acts counter to said coils. If a superconductor were cooled to below its superconducting transition temperature Tc in an external non-homogeneous magnetic field, the shape of this external magnetic field would be frozen in its present position in the superconductor. Said force is predominantly oriented, depending on the orientation of the magnets, perpendicularly to the rail as a lifting force or in parallel with the rail as a propulsive force.

DE 19 52 757 A describes a superconducting suspension for an electrodynamic levitating transport system. The diamagnetic properties of type I superconductors, such as lead, make it possible for surface currents to build up which generate a magnetic field that counteracts a field acting from the outside.

Likewise, DE 42 04 732 A1 discloses, by way of example, a maglev train in which a plurality of vehicle-side superconducting magnets arranged in series act counter to line-side carrier coils. This approach is also taken in the current maglev system, a Japanese maglev train project between Tokyo and Osaka, Japan, in which a linear motor draws on the coils in order to transmit driving force and braking force to the line.

A basic requirement when using superconductors is producing the required cooling to below the transition temperature $T_c$. Only in recent years have superconductor materials having a $T_c$ above the boiling point of nitrogen become available, which significantly simplifies, if not entirely facilitates, technological implementation. By combining a magnet with a superconductor having a high transition temperature $T_c$, magnetic levitation and movement can be achieved, it being possible to utilize the diamagnetism of the superconductor.

DE 102 18 439 A1 describes, by way of example, a magnet arrangement concept for the suspension and guidance of levitating vehicles in which an arrangement of a magnetic-part arrangement and a superconductor arrangement that is physically connected thereto and is made up of one or more superconductors (preferably melt-textured YBaCuO material) is opposite an arrangement of three magnetic rails. Embodiments including a line-side or vehicle-side superconductor arrangement are disclosed. In certain embodiments, the superconducting components are provided with heat-insulating material and/or a layer protecting against oxidation and/or exposure to moisture.

SUMMARY

In an embodiment, the present invention provides a rail-bound maglev train. The rail-bound maglev train includes: a guide rail specifying a travel path, the guide rail including at least one superconducting element; and a levitating vehicle arranged on the guide rail, the vehicle including a magnet, wherein the magnet is configured to magnetically interact with the travel path in a contactless manner. The at least one superconducting element includes at least one superconducting conductor extending in parallel with the travel path. The at least one superconducting conductor includes at least two electrical connections, the at least two electrical connections being on one strip and in each case delimiting a strip portion arranged therebetween as a continuous superconducting electrical cable.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
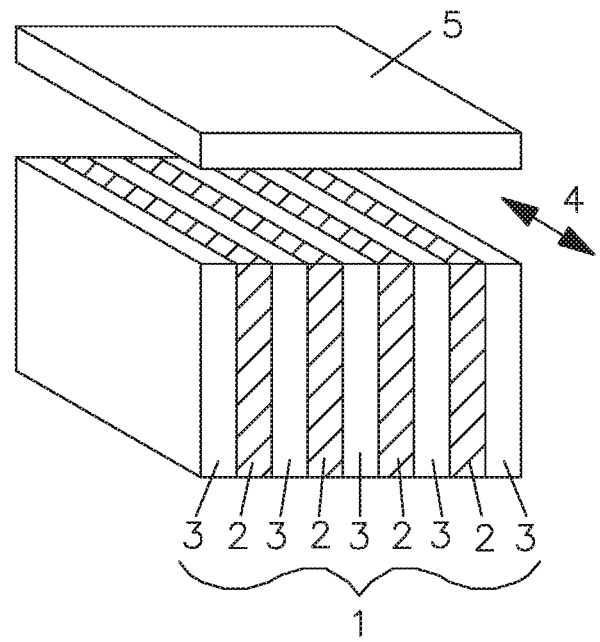
FIG. 1 is a schematic view of a first embodiment, comprising a line-side laminated composite made of at least one superconducting strip as the conductor and at least one strip made of a soft-magnetic material such as iron, in parallel with the travel path.

In all the known concepts using superconductor elements, said elements are used to ensure magnetic or electrodynamic interaction. Proceeding therefrom, embodiments of the invention provide a rail-bound maglev train in which the line is also particularly well suited to transporting power.

A rail-bound maglev train system is described herein, a line preferably being formed by a guide rail comprising a superconducting element. The guide rail specifies a travel path for a vehicle that is levitating thereon. For this purpose, the vehicle comprises magnetic means which magnetically interact with the travel path in a contactless manner. The line-side superconducting element is thus used to generate and fix a magnetic field in a known, above-mentioned manner, and thus forms the opposite magnetic pole to the vehicle-side magnetic means at least in part.

In one embodiment, the vehicle-side means preferably comprise one or more superconducting elements. An alternative embodiment of these magnetic means comprises magnets that are arranged in series in the direction of the travel path and have alternatingly opposite pole directions towards the magnetically corresponding means in the line or rail. In both cases, the means interact with the magnetic fields generated on the line side or means therefor and generate magnetic forces counter thereto.

The at least one superconducting element, which is formed by at least one superconducting conductor, more preferably along, i.e. in parallel with, the travel path is provided according to an embodiment. Furthermore, the at least one superconducting conductor or at least part thereof is designed as a continuous superconducting electrical cable and is used as such. Therefore, the at least one superconducting conductor comprises at least two electrical connections per conductor. Preferably, these are arranged at either end of each conductor.

The superconducting element (conductor) is therefore used not only for generating and fixing a magnetic field, but also as a superconducting electrical cable for transporting electrical power in the line along the travel path with no losses or minimal losses.

The connections are preferably formed by low-resistance normal conductor/superconductor contacts, preferably pressure contacts or also solder-based connections.

One embodiment provides that a plurality of superconducting conductors are connected in succession, i.e. in series, to form a cable. Preferably, the ends of the conductors that are arranged in succession in the line or guide rail are electrically interconnected and thus form the electrical connections for the conductors that are connected in each case.

A particular requirement is to ensure a temperature of below $T_c$ in the line over the entire extension of the cable. This is preferably implemented by the entire track comprising the superconducting elements being positioned in a cryostat that is cooled to the desired operating temperature $T<T_c$ in its interior. Here, the cooling preferably takes place in a closed cooling circuit.

One embodiment provides that superconducting conductors extending in parallel in the guide rail are connected in parallel, i.e. are electrically interconnected at least two points. Owing to the redundant cable connections thus produced by the conductors connected in parallel, local disturbances in the superconducting properties of a conductor can advantageously be bypassed by respectively adjacent strips.

A superconducting conductor of the above-mentioned type preferably is or comprises a strip, or alternatively a wire, as is also preferred.

One embodiment of the rail-bound maglev train provides points of discontinuity, preferably in the electrical conductivity and/or the geometry in the superconducting element in the direction of the travel path. More preferably, the points of discontinuity are arranged on the surface of the superconducting element, in the context of embodiments, as a depression in or attachment on the superconducting element.

The points of discontinuity can be identified by means arranged in the vehicle. These preferably include optical or magnetic sensors which detect the points of discontinuity when the vehicle is traveling over the travel path and initiate a signal. In a more preferred embodiment, these means for identifying the discontinuities are formed by the above-mentioned magnetic means that magnetically interact with the travel path in a contactless manner. The initiated signal is preferably used to trigger an event, for example braking. Alternatively, the discontinuity is used as a target marker when positioning the vehicle during a movement process.

One embodiment of the rail-bound maglev train therefore provides that a plurality of superconducting conductors such as strips or wires are arranged in succession, i.e. in series, and are preferably electrically connected by soft-magnetic flow-guidance parts. Therefore, points of discontinuity are generated in the conductor in the homogeneous current flow that do not occur in a continuous strip or wire and would ensure an advantageously homogeneous current flow having advantageously low losses. The points of discontinuity having soft-magnetic flow-guidance parts, however, generate local non-homogeneous magnetic fields on the surface of the line, which can advantageously be used in the above-mentioned manner.

The invention also includes a use of the rail-bound maglev train as a transport means for people and goods.

One preferred embodiment provides a use for linear positioning e.g. for transport assignments and for positioning in a production process. Markers in the superconducting conductor.

The preferred embodiment of the rail-bound maglev train shown in FIG. 1 provides a line-side laminated composite 1 made of at least one superconducting strip 2 and at least one strip made of a soft-magnetic material 3, in parallel with the travel path (direction of travel 4). Iron strips and superconducting strips are preferably stacked in parallel and more preferably in an alternating order to form said laminated composite. Strips made of a soft-magnetic material and superconducting strips also preferably have a consistent width and length, and this gives the laminated composite a preferably rectangular cross section and thus also a preferred direction for the magnetic field. The laminated composite is also integrated in the line or itself forms the line or rail of the rail-bound maglev train. Here, the strips in the laminated composite are preferably oriented orthogonally to the magnetic means of the vehicle positioned on the line in order to achieve a maximum magnetic field effect (preferred direction). In this embodiment, said magnetic means are preferably formed by one (cf. FIG. 1) or more vehicle-side superconducting elements 5.

The strips made of a soft-magnetic material 3 preferably comprise, at least in part, iron strips or strips made of one or more soft-magnetic alloys, or consist of said strips. Here, it is essential here that the soft-magnetic material amplifies the magnetic field generated by the superconductor (through which current flows) and thus guides said field to the surface of the track, which advantageously increases the magnetic flux density gradient.

FIG. 1 shows an electrodynamic levitating train concept by way of example.

Figure 2:
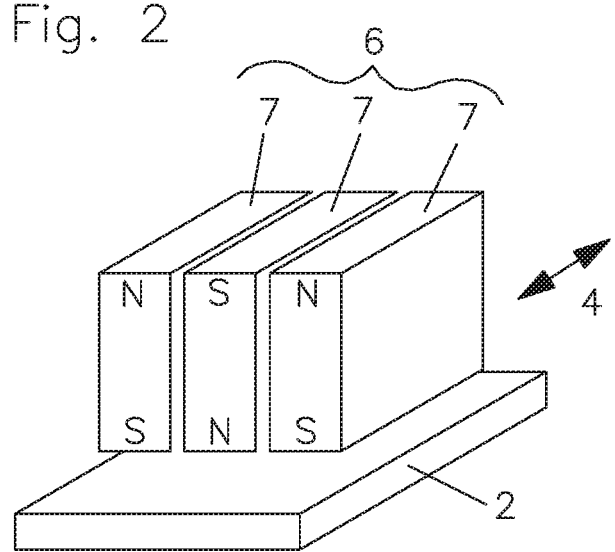
FIG. 2 is a schematic view of another preferred embodiment, comprising a line-side superconducting strip or a stack of layers made of superconducting strips.

Another preferred, exemplary embodiment of the rail-bound maglev train is shown schematically in FIG. 2. This provides a superconducting strip 2 (as shown) or a stack of layers made of superconducting strips in the line or rail, with at least one of these strips being oriented in parallel with the travel path 4 of the vehicle and preferably also with the magnetic means 6 in a vehicle travelling thereon. In this embodiment, these vehicle-side magnetic means are preferably formed by magnets 7 that are arranged in series in the direction of the travel path and have alternatingly opposite pole directions (shown by the pole direction north-south or N-S) towards the superconducting strip.

FIG. 2 shows, by way of example and depending on whether the magnets 7 are designed as electromagnets or permanent magnets, an electromagnetic or permanent-magnetic maglev train concept.

A superconducting conductor as mentioned at the outset, shown in FIGS. 1 and 2 by way of example in the form of a superconducting strip 2, preferably is or comprises a strip, or alternatively a wire, as is also preferred. Strips and wires differ in terms of a current flow in the formation of the surrounding electrical and thus magnetic fields. In the embodiment shown in FIG. 1, wires and strips are equally suitable. For the embodiment according to FIG. 2, the track must however consist of a stack of a strips. Only in this way can corresponding magnetic field configurations (appropriate for the vehicle) be imposed over the track.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 laminated composite
2 superconducting strip
3 strip made of soft-magnetic material
4 direction of travel
5 superconducting element
6 magnetic means
7 magnet

The invention claimed is:
1. A rail-bound maglev train, comprising:
a guide rail specifying a travel path, the guide rail including at least one superconducting element; and
a levitating vehicle arranged on the guide rail, the vehicle including a magnet, wherein the magnet is configured to magnetically interact with the guide rail in a contactless manner,
wherein the at least one superconducting element includes at least one superconducting conductor extending in parallel with the travel path, and
wherein the at least one superconducting conductor forms a continuous superconducting electrical line configured to transport electrical power and includes at least two electrical connections,
wherein the at least two electrical connections are positioned at a first end of the continuous superconducting electrical line and at a second end of the continuous superconducting electrical line opposite the first end, and
wherein the at least one superconducting conductor is configured to both (i) transport electrical power along the travel path from the first end to the second end and (ii) generate a magnetic field that causes the vehicle arranged on the guide rail to levitate.

2. The rail-bound maglev train according to claim 1, wherein the at least one superconducting conductor is at least one superconducting strip and/or at least one superconducting wire.

3. The rail-bound maglev train according to claim 1, wherein the at least one superconducting conductor is formed by a plurality of superconducting strips connected in series.

4. The rail-bound maglev train according to claim 1, wherein the at least one superconducting conductor is oriented orthogonally to the magnet.

5. The rail-bound maglev train according to claim 1, wherein the at least one superconducting conductor is oriented in parallel with the magnet, and
wherein the magnet comprises first and second magnets that are arranged in series in the direction of the travel path and have alternatingly opposite pole directions towards the at least one superconducting conductor.

6. The rail-bound maglev train according to claim 1, wherein the superconducting element has discontinuities in geometric and/or electrical properties in the direction of the travel path.

7. The rail-bound maglev train according to claim 6, wherein the vehicle further includes optical and/or magnetic sensors configured to identify the discontinuities.

8. The rail-bound maglev train according to claim 6, wherein the vehicle further includes sensors configured to identify the discontinuities.

9. The rail-bound maglev train according to claim 1, wherein the magnet is formed by a vehicle-side superconducting element.

10. A rail-bound maglev train, comprising:
a guide rail specifying a travel path, the guide rail including at least one superconducting element; and
a levitating vehicle arranged on the guide rail, the vehicle including a magnet, wherein the magnet is configured to magnetically interact with the guide rail in a contactless manner,
wherein the at least one superconducting element includes at least one superconducting conductor extending in parallel with the travel path, and
wherein the at least one superconducting conductor forms a continuous superconducting electrical line configured to transport electrical power and includes at least two electrical connections, and
wherein the at least one superconducting element further includes at least one soft-magnetic material extending in parallel with the travel path and forming a laminated composite with the at least one superconducting conductor.

11. The rail-bound maglev train according to claim 5, wherein the at least two electrical connections are positioned at a first end of the continuous superconducting electrical line and at a second end of the continuous superconducting electrical line opposite the first end.

12. The rail-bound maglev train according to claim 11, wherein the at least one superconducting conductor is configured to both (i) transport electrical power along the travel path from the first end to the second end and (ii) generate a magnetic field that causes the vehicle arranged on the guide rail to levitate.

13. The rail-bound maglev train according to claim 10, wherein the at least one superconducting conductor is a plurality of superconducting conductors formed by strips of superconducting material, wherein the at least one soft-magnetic material includes a plurality of strips of soft-magnetic material, and wherein the laminated composite includes the plurality of strips of superconducting material and the plurality of strips of soft-magnetic material arranged in alternating fashion.

14. The rail-bound maglev train according to claim 10, wherein the at least one soft-magnetic material is configured to amplify a magnetic field generated by the super-conductor and guide the magnetic field to a surface of the guide rail.

15. A rail-bound maglev train, comprising:
a guide rail specifying a travel path, the guide rail including at least one superconducting element; and
a levitating vehicle arranged on the guide rail, the vehicle including a magnet, wherein the magnet is configured to magnetically interact with the guide rail in a contactless manner,
wherein the at least one superconducting element includes at least one superconducting conductor extending in parallel with the travel path, and
wherein the at least one superconducting conductor forms a continuous superconducting electrical line configured to transport electrical power and includes at least two electrical connections,
wherein the at least one superconducting conductor is formed by a plurality of superconducting strips connected in series, and
wherein each pair of superconducting strips of the plurality of superconducting strips connected in series are connected by soft-magnetic flow-guidance connectors.

16. The rail-bound maglev train according to claim 15, wherein the soft-magnetic flow-guidance connectors create discontinuities in the electrical properties of the at least one superconducting conductor.

17. The rail-bound maglev train according to claim 16, wherein the levitating vehicle further includes optical and/or magnetic sensors configured to detect the discontinuities.

18. The rail-bound maglev train according to claim 15, wherein the at least two electrical connections are positioned at a first end of the continuous superconducting electrical line and at a second end of the continuous superconducting electrical line opposite the first end, and
wherein the at least one superconducting conductor is configured to both (i) transport electrical power along the travel path from the first end to the second end and (ii) generate a magnetic field that causes the vehicle arranged on the guide rail to levitate.

19. A rail-bound maglev train, comprising:
a guide rail specifying a travel path, the guide rail including at least one superconducting element; and
a levitating vehicle arranged on the guide rail, the vehicle including a magnet, wherein the magnet is configured to magnetically interact with the travel path in a contactless manner,
wherein the at least one superconducting element includes at least one superconducting conductor extending in parallel with the travel path, and
wherein the at least one superconducting conductor includes at least two electrical connections, the at least two electrical connections being on one strip and in each case delimiting a strip portion arranged therebetween as a continuous superconducting electrical cable,
wherein the at least one superconducting conductor together with at least one iron conductor form a laminated composite when stacked in an alternating order, and
wherein the magnet is formed by a vehicle-side superconducting element.

20. The rail-bound maglev train according to claim 19, wherein the conductors are oriented in parallel with the travel path and orthogonally to the magnet.

\* \* \* \* \*